(12) United States Patent
Deck

(10) Patent No.: US 11,032,101 B2
(45) Date of Patent: Jun. 8, 2021

(54) VEHICLE HAVING FAIL-SAFE INTERNAL DATA TRANSFER

(71) Applicant: Northrop Grumman Litef GmbH, Freiburg (DE)

(72) Inventor: Matthias Deck, Bad Krozingen (DE)

(73) Assignee: NORTHROP GRUMMAN LITEF GMBH

( * ) Notice: Subject to any disclaimer, the term of this patent is extended or adjusted under 35 U.S.C. 154(b) by 0 days.

(21) Appl. No.: 16/764,688

(22) PCT Filed: Dec. 18, 2018

(86) PCT No.: PCT/EP2018/085600
§ 371 (c)(1),
(2) Date: May 15, 2020

(87) PCT Pub. No.: WO2019/121750
PCT Pub. Date: Jun. 27, 2019

(65) Prior Publication Data
US 2020/0412575 A1 Dec. 31, 2020

(30) Foreign Application Priority Data

Dec. 18, 2017 (DE) .......................... 102017130386.3

(51) Int. Cl.
*H04L 12/437* (2006.01)
*H04L 12/46* (2006.01)
(Continued)

(52) U.S. Cl.
CPC ........ *H04L 12/437* (2013.01); *H04L 12/2859* (2013.01); *H04L 12/2874* (2013.01); *H04L 12/40045* (2013.01); *H04L 12/4637* (2013.01); *H04L 2012/40267* (2013.01); *H04L 2012/421* (2013.01)

(58) Field of Classification Search
CPC .............. H04L 12/437; H04L 12/4637; H04L 12/40045; H04L 12/2874; H04L 12/2859; H04L 2012/421; H04L 2012/40267
See application file for complete search history.

(56) References Cited

U.S. PATENT DOCUMENTS 4,651,317 A * 3/1987 Tashiro .................. G08C 15/12
370/216
7,698,039 B2 * 4/2010 Uchida ................ H04B 10/032
701/48
(Continued)

FOREIGN PATENT DOCUMENTS

DE 10163393 A1 7/2003
DE 102012214849 A1 2/2013
(Continued)

*Primary Examiner* — Rasheed Gidado
(74) *Attorney, Agent, or Firm* — Tarolli, Sundheim, Covell & Tummino LLP

(57) ABSTRACT

The invention relates to a vehicle having fail-safe internal data transfer. The vehicle comprises a vehicle body and a wired data transfer network provided on the vehicle body. Furthermore, network subscribers are provided on the vehicle body, which network subscribers are connected to each other via respective network nodes of the data transfer network. The data transfer network has a data-transferring ring wiring.

14 Claims, 6 Drawing Sheets

(51) Int. Cl.
*H04L 12/40* (2006.01)
*H04L 12/28* (2006.01)
*H04L 12/42* (2006.01)

(56) References Cited

U.S. PATENT DOCUMENTS

| | | | |
|---|---|---|---|
| 8,582,424 B2* | 11/2013 | Kirrmann | H04L 12/437 |
| | | | 370/222 |
| 9,908,523 B2* | 3/2018 | Kimura | B60W 20/50 |
| 2011/0029687 A1 | 2/2011 | Kirrmann et al. | |
| 2011/0116508 A1 | 5/2011 | Kirrmann | |
| 2015/0138954 A1 | 5/2015 | Ross | |
| 2016/0231749 A1* | 8/2016 | Shimamura | G05D 1/0265 |
| 2019/0385057 A1* | 12/2019 | Litichever | H04L 63/14 |

FOREIGN PATENT DOCUMENTS

| | | |
|---|---|---|
| DE | 102015010969 A1 | 3/2017 |
| DE | 102016110148 A1 | 12/2017 |
| DE | 102016110150 A1 | 12/2017 |
| WO | 0018064 A2 | 3/2000 |

* cited by examiner

VEHICLE HAVING FAIL-SAFE INTERNAL DATA TRANSFER

RELATED APPLICATIONS

The present invention is a U.S. National Stage under 35 USC 371 patent application, claiming priority to Serial No. PCT/EP2018/085600, filed on 18 Dec. 2018; which claims priority of DE 102017130386.3, filed on 18 Dec. 2017, the entirety of both of which are incorporated herein by reference.

The present invention relates to a vehicle having fail-safe internal data transfer, in particular, a ship or submarine with a highly available navigation network.

The constant, current availability of navigation data is essential for survival on vehicles, in particular, military vehicles such as ships and submarines. The use of Ethernet-based networks on vehicles is known, however, these networks are normally designed as a star network with a star topology with network switches or as a bus network, where all subscribers are connected to a common data transfer medium (bus) via short lines. Thus, due to the use of network switches, so-called single points of failure exist, which restrict the availability and reliability of the network. One approach to eliminate this source of error by a second parallel network leads to an increased wiring expenditure and additional switches on board the vehicle, in particular, a ship. Also, the messages in the applications are doubled and transmitted via the two parallel networks. The receiver must then filter out the duplicate.

The present invention is therefore based on the object to provide a vehicle having fail-safe internal data transfer, which provides high reliability of the internal data transfer with reduced wiring expenditure at the same time.

This object of the present invention is solved by the vehicle having fail-safe internal data transfer according to claim 1. Advantageous embodiments and further developments of the invention are stated in the sub-claims.

According to the invention, a vehicle having fail-safe internal data transfer is provided, which has a vehicle body, a wired data transfer network provided on the vehicle body, and network subscribers provided on the vehicle body. The network subscribers are connected to one another via network nodes of the data transfer network. The data transfer network has a data-transferring ring wiring.

Thus, the invention relates to highly available navigation networks for ships and submarines where high reliability is achieved by redundancy and the avoidance of single points of failure. In this process, a data-transferring ring wiring is laid within a vehicle body such as a ship's hull, an air vehicle body or a land vehicle body in such a manner that, in the case of transection of the network cable, a connection of all network nodes and connected devices remains in place. Thus, it can be ensured especially for use in the military area that, in the case of destruction of an area of the vehicle body, it is ensured that a weapons system is still supplied with corresponding position and navigation data and thus remains fit for military service.

In this process, it is advantageous for a fail-safe use in water, air or on land if the vehicle comprises a water vehicle, an air vehicle or a land vehicle.

For use in the military area, it is practical if the vehicle is a military vehicle, which has at least one weapon and at least one position detection device as network subscribers.

To ensure maximum reliability in the case of bombardment or in the case of damage of the vehicle, it is advantageous if a minimum area defined by the data-transferring ring wiring is larger than 20% of a maximum cross-sectional area of the vehicle body.

In the case of bombardment or damage due to an air raid, it is particularly advantageous if a minimum area defined by the data-transferring ring wiring is larger than 20% of a maximum cross-sectional area of the vehicle body parallel to the horizontal.

To exclude the destruction of a majority of the data-transferring ring wiring according to the invention, it is practical if the minimum area defined by the data-transferring ring wiring is larger than 5 m$^2$.

For additional redundancy and a reduction of single points of failure, it is advantageous if the data transfer network has at least two data-transferring ring wirings.

For maximized fail safety of the data transfer network according to the invention, it is particularly advantageous if, in exactly the same way as the World Wide Web, the data-transferring ring wirings form a network wiring.

In order to be able to provide separated network segments with different security requirements or operating periods, it is advantageous if at least two of the data-transferring ring wirings are designed separately and, in each case, decouple-ably connected to one another via a connecting means.

In this process, it is practical if the connecting means couples the data-transferring separate ring wirings to one another in a redundant manner.

To avoid problems due to cable lengths in the case of a large expansion of the data transfer network according to the invention, it is practical if the data-transferring ring wiring comprises a fiber optic cable or a twisted pair line.

For the provision of exact time synchronization with high fail safety, it is advantageous if the data transfer network is suited for synchronization of the network subscribers.

For the optimum support of bidirectional and full duplex communication between two network nodes, it is advantageous if the data transfer network is suited for Ethernet-based data transfer by means of an HSR/PRP protocol.

For simultaneous fail safety of the power supply of the network subscribers of the data transfer network according to the invention, it is practical if the vehicle has a power supplying ring wiring for supplying the network subscribers of the data-transferring ring wiring with energy.

For universal use of devices of the vehicle according to the invention it is practical if the network subscribers have at least one appliance selected from a group which comprises a weapons control system, an integrated platform management system, an integrated monitoring and control system for helicopters, a demagnetizing system, a gyrocompass, a magnetic compass or a GPS/GLONASS receiver, an EM log, a Doppler log, an echo device, an automatic identification system AIS, an integrated control and monitoring system ICMS, a sonar, a periscope system, a weather station, a radar, a communication system, friend/foe identification IFF, an electronics assistance device, a repeater or empennage stabilization.

The invention is described in detail in the following text, with reference to the figures in an exemplary manner. The subject matter of the invention is defined by the claims, in which:

Figure 6:
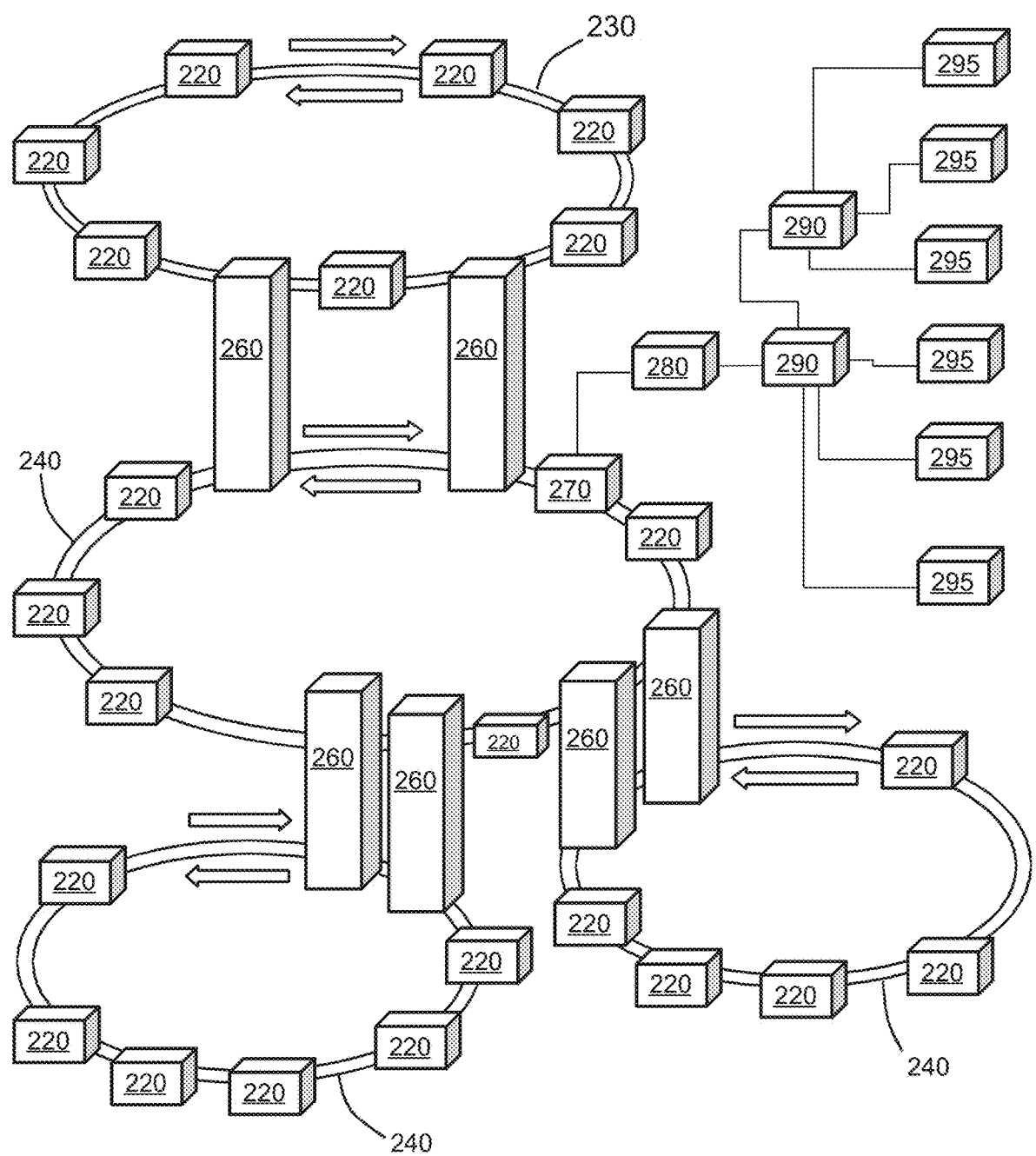
Figure 7A:
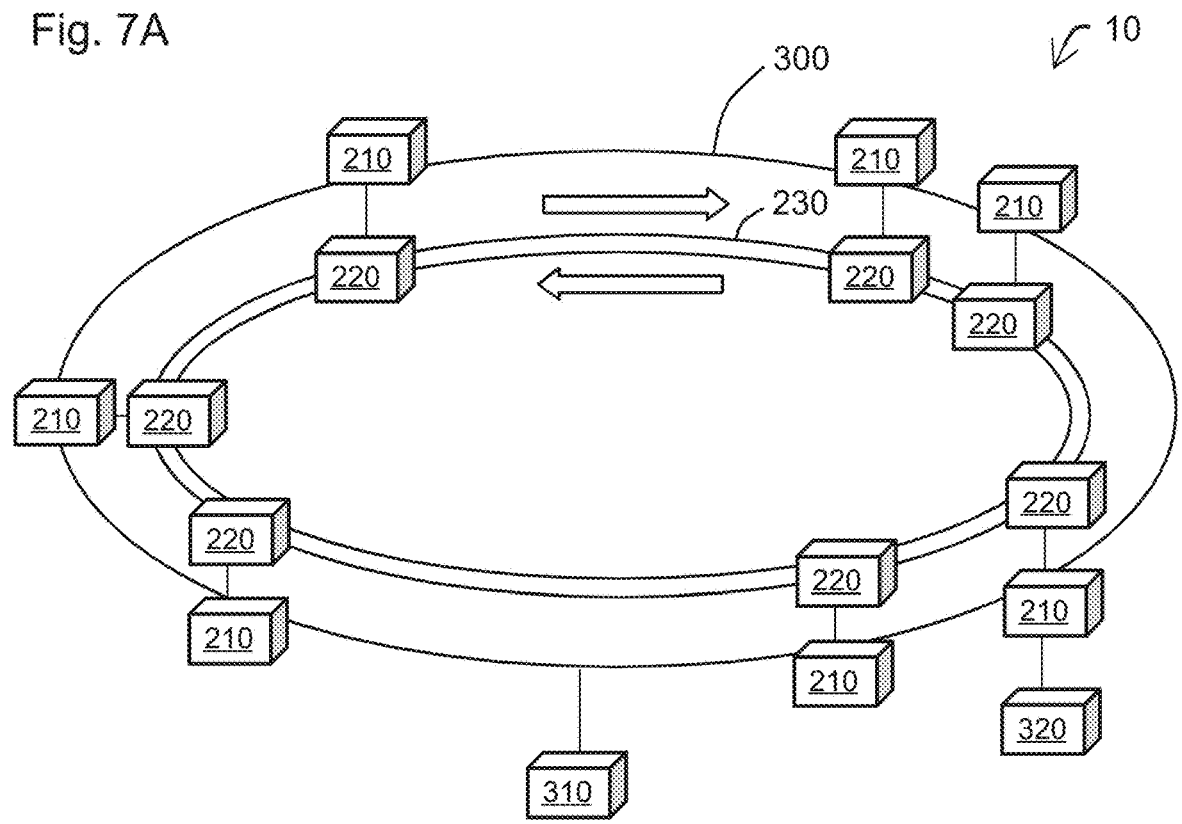
Figure 7B:
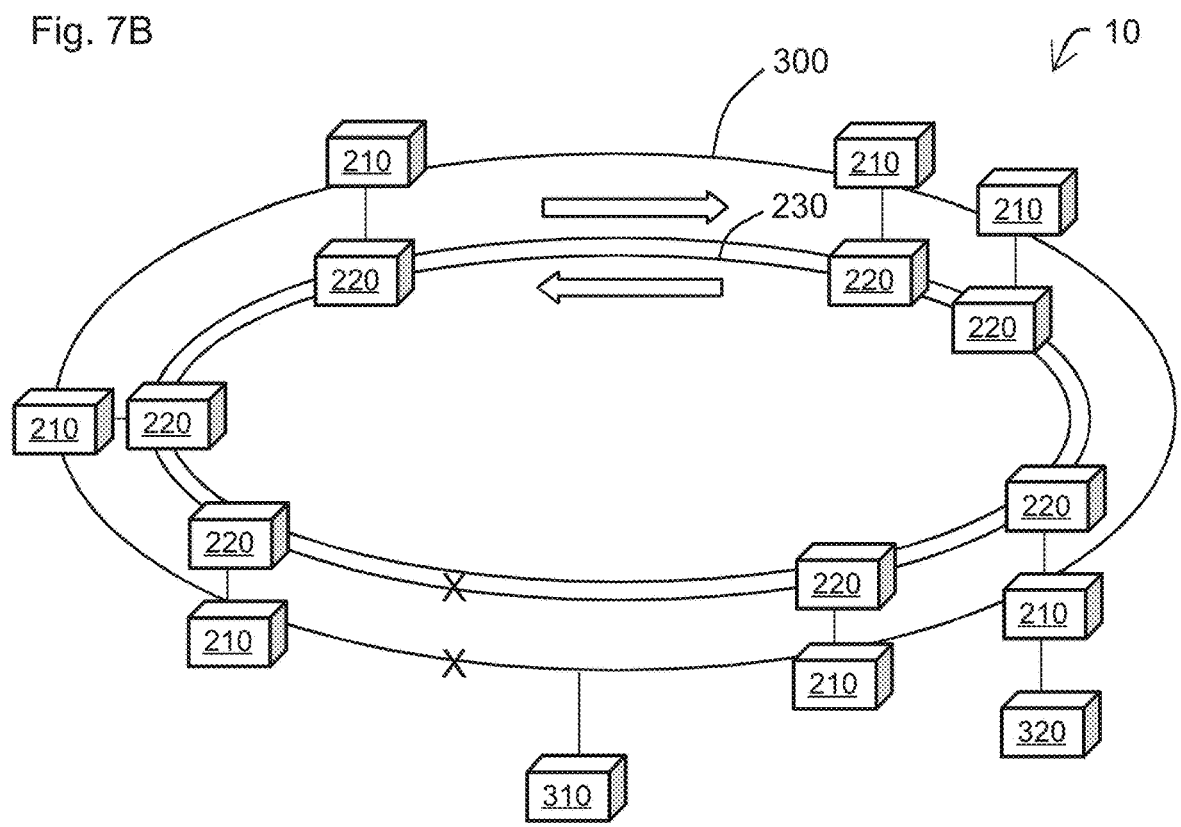

FIG. 6 shows a schematic block diagram of a data transfer network with at least two separate data-transferring ring wirings according to an exemplary embodiment of the present invention; and FIGS. 7A and 7B show schematic block diagrams of a wired data transfer network according to the invention with and without a defect, with the network subscribers of the data-transferring ring wiring being supplied with energy by a power supplying ring wiring.

Figure 1:
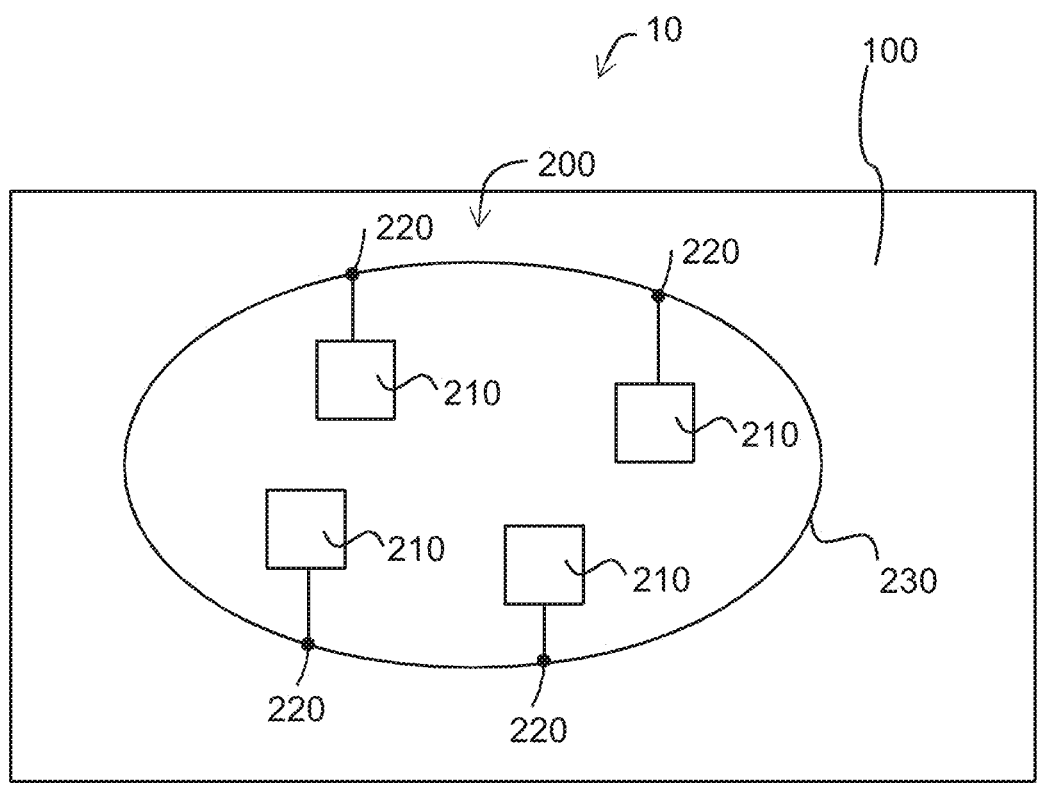
FIG. 1 shows a schematic block diagram of a vehicle having fail-safe internal data transfer according to the present invention.

FIG. 1 shows a schematic block diagram of a vehicle 10 having fail-safe internal data transfer according to an exemplary embodiment of the invention. The vehicle 10 has a vehicle body 100 and a wired data transfer network 200 provided on the vehicle body 100. Furthermore, network subscribers 210 are provided on the vehicle body 100, which are connected to one another via network nodes 220 of the data transfer network 200. According to the invention, the data transfer network 200 has a data-transferring ring wiring 230.

In data transfer networks and, in particular, computer networks, the following basic network topologies, i.e. the topological structure of a computer network, are known.

In a star network or a star topology, the individual network subscribers are each connected to a central node in the form of a star, with communication of the network subscribers taking place via a so-called network switch. However, this so-called star network has the disadvantage that, in the case of a failure of the central network node, the entire network fails. In addition, this can lead to overloading of the central network node in the case of too many transmission requests of the network subscribers taking part in the network communication.

In a so-called bus network, all subscribers are connected to a common data transfer medium, the so-called bus, via short lines. In this process, data is transmitted via a passive medium without a central coordination function, with the failure of one subscriber not having any effects on the communication of the remaining network subscribers. If, however, the bus wiring is damaged, the network subscribers are separated due to the defect within the bus network.

In a so-called tree network, there is a hierarchical connection between the individual network nodes, with the communication always taking place between the respective network nodes of a hierarchical level via the so-called root node.

In a ring network or loop network, each network subscriber is connected to exactly one precursor and one successor.

Transmission is controlled on the basis of the so-called token procedure. Token-Ring is a networking technology for computer networks, which is specified in specification IEEE 802.5. The logical topology of Token-Ring is a ring. In this process, a so-called token circles over the ring in Token-Ring networks. The token is always passed on from one node to the next. Even in idle mode, the stations continuously pass on the package. If a network subscriber wants to transmit data, it will wait until the token has reached it, then it will attach its user data to it. At the same time, it supplements the token with control signals and, in addition, sets the token bit from zero (for a free token) to one, i.e. the free token becomes a data frame. After this process, the computer places the data frame on the ring again, where it, similarly to the free token before, is passed on by the individual nodes. Every computer checks whether the package is addressed to it, and otherwise places it back on the ring. If the intended network subscriber receives the data frame addressed to it, it will copy the user data and acknowledge the data reception. The transmitter receives the acknowledgment and transmits the token with the next user data or places a free token on the ring. In this process, a transmitter may only use the token for a specific time, before it must release it again. In this way, each node in a ring is guaranteed that it, after this specified time ("token holding time") has expired, may transmit in a ring.

A further development of a ring or loop topology for Ethernet-based networks is a "High Available Seamless Redundancy" (HSR) or "Parallel Redundant Protocol (PRP)" data transfer architecture, which is defined by the standard IEC 62439-3 Clause 5 or Clause 4. In an HSR/PRP data transfer architecture, the network subscriber need not, when transmitting messages via two parallel networks, filter out any duplicates, since this is efficiently realized and managed in the hardware. In this process, the data transfer network with a data-transferring ring wiring 230 can have standard Ethernet components or standard gigabit Ethernet components. The communication between two network nodes 220 is bidirectional and full duplex. Thus, only one cable between two network nodes 220 is required. The data is transmitted in both directions by the transmitting network node 220 and deleted again upon the receipt of the same data.

In accordance with the invention, a vehicle 10 is now provided, which has a data transfer network 200 with a ring or loop topology. In this process, the data transfer network 200 can be suited for Ethernet-based data transfer by means of an HSR/PRP protocol described above.

Figure 2A:
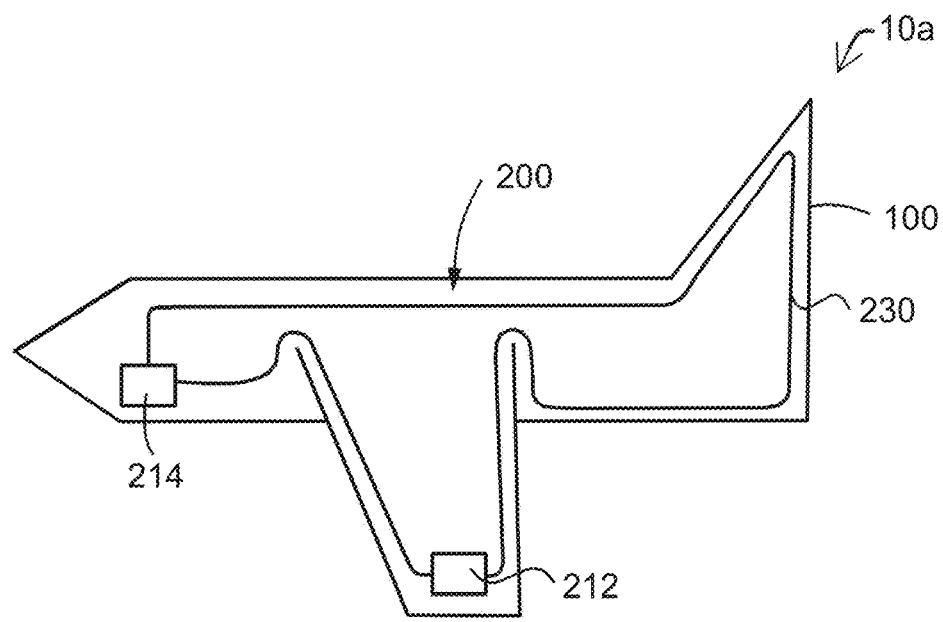
FIGS. 2A to 2C show schematic views of embodiments of a vehicle with a weapon and a position detection device according to the present invention.
Figure 2B:
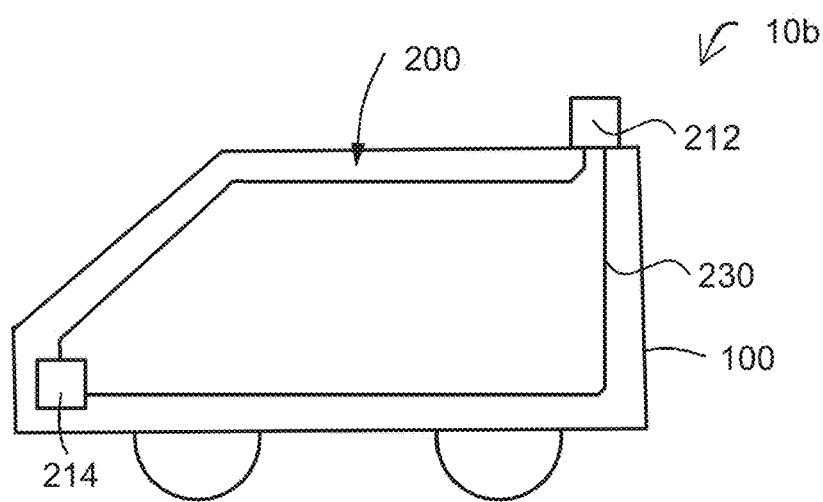
Figure 2C:
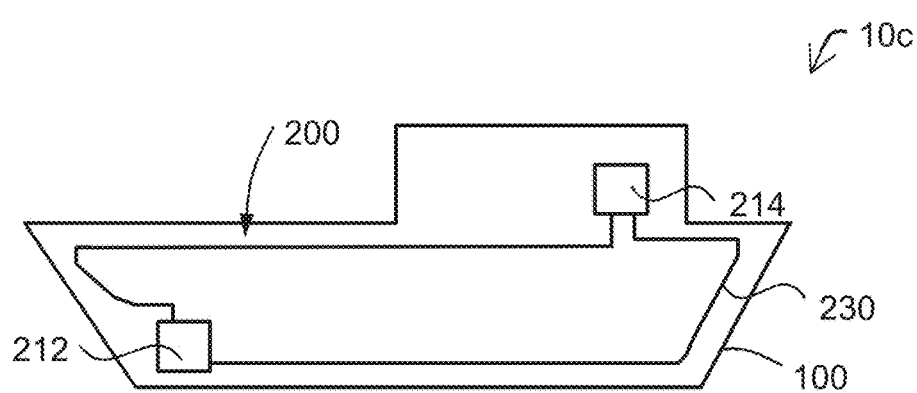

As shown in FIGS. 2A to 2C, the vehicle 10 can comprise either an air vehicle 10a (see FIG. 2A), a land vehicle 10b (see FIG. 2B), or a water vehicle 10c (see FIG. 2C). In this process, the vehicle 10 can be an air vehicle 10a, a land vehicle 10b, a water vehicle 10c, or a mixed form of the aforementioned vehicles. By way of example, the vehicle 10 can also be a seaplane or an amphibious vehicle. Hence, a mobile platform is to be understood by the vehicle 10, which is not stationary, but can change its position independently.

In FIGS. 2A to 2C, the vehicle 10 is, in particular, illustrated as a military vehicle 10a to 10c, which has at least one weapon 212 and at least one position detection device 214 as network subscribers 210. The constant, current availability of navigation data of all devices, in particular, of the weapons system, is essential for survival in military vehicles, in particular, ships and submarines. In military vehicles, the availability or fail safety of the data transfer network 200 is extremely challenged, since normally a bombardment through hostile vehicles takes place in a military use. Therefore, a defect in the data-transferring ring wiring 230 is not an unlikely event, but can occur at any time if the vehicle 10 is hit. Since a failure of the weapons system 212, due to a lack of navigation data or other relevant data received, massively affects the fitness for military service and thus the survivability of the vehicle 10, the data transfer network 200 has, in accordance with the invention, a data-transferring ring wiring 230, which still enables communication of the weapon 212 with the shown position detection device 214 in the case of a defect within the data-transferring ring wiring 230.

The network subscribers shown in FIGS. 2A to 2C, in particular, the weapon 212 and the position detection device 214, are to be understood as exemplary embodiments of network subscribers 210 of the vehicle 10. In a design of the vehicle 10 as a ship or submarine or as a helicopter, a multitude of additional network subscribers 210 can be used.

For example, the network subscribers 210 can have at least one appliance selected from a group which comprises a weapons control system, an integrated platform management system, an integrated monitoring and control system for helicopters, a demagnetizing system, a gyrocompass, a magnetic compass or a GPS/GLONASS receiver, an EM log, a Doppler log, an echo device, an automatic identification system AIS, an integrated control and monitoring system ICMS, a sonar, a periscope system, a weather station, a radar, a communication system, friend/foe identification IFF, an electronics assistance device, a repeater or empennage stabilization. Thus, the vehicle 10 can, as a network subscriber 210, have at least one of the aforementioned devices.

However, for maximization of the fail safety of the ring wiring 230, not only the pure provision of a ring architecture is decisive, but also the genuine real topology of the ring wiring 230. This is to be illustrated based on FIGS. 3A and 3B.

Figure 3A:
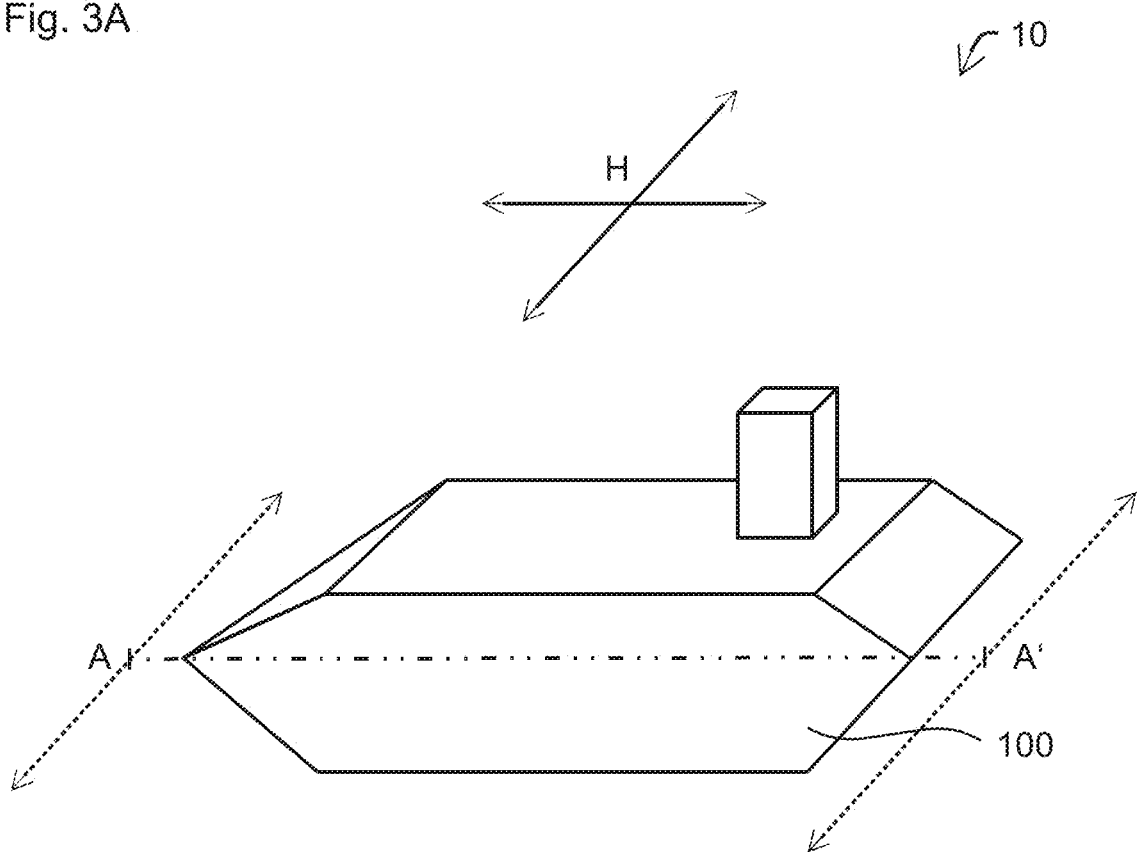
FIGS. 3A and 3B show a schematic perspective view, as well as a cross-sectional view along the plane AA' of a vehicle designed as a water vehicle having fail-safe internal data transfer according to the present invention.

FIG. 3A shows a schematic perspective view of a vehicle 10, which is configured as a water vehicle 10C. In particular, the water vehicle 10C can be a ship or a submarine. However, the physical topology of the data-transferring ring wiring 230 described in the following text is not meant to be restricted to one application in the water vehicle 10c shown, but is also meant to apply to each vehicle 10, such as an air vehicle or a land vehicle, described above.

The network wiring of the data transfer network 200 forms a closed ring or loop and is provided on the vehicle body 100. In the case of a plurality of data-transferring ring wirings 230, or in the case of the design of a data-transferring network wiring as described further below, that wiring is to be selected as the decisive data-transferring ring wiring 230, which defines the largest area by its wiring. The minimum area MF is to be used as the decisive area. Mathematically, a minimum area is defined as an area in space, which locally has a minimum surface area for a given boundary line in space. For example, soap films take on such forms if stretched over a corresponding frame such as a blow ring. In the simplest case, in which the data-transferring ring wiring 230 is completely within a plane, the minimum area MF is a plane annular surface.

The larger the minimum area MF defined by the data-transferring ring wiring 230, the lower the probability of failure in the case of a defect or a location of the data-transferring ring wiring 230 hit. Although an arbitrarily large minimum area MF is particularly preferred, it is normally not larger than a maximum cross-sectional area MQF of the vehicle body 100. Therefore, it is preferred that a minimum area MF defined by the data-transferring ring wiring 230 is larger than 20%, larger than 30%, larger than 40%, larger than 50%, larger than 60%, larger than 70%, larger than 80% or larger than 90% of a maximum cross-sectional area MQF of the vehicle body 100.

The maximum cross-sectional area MQF of the vehicle body 100 is to be defined as an area, which is defined by an outer shell of the vehicle body 100 and intersects the vehicle body 100 in a straight plane. In this process, the largest possible cross section, i.e. maximum cross-sectional area MQF, is selected from all possible cross sections of the vehicle body 100. In this process, the maximum cross-sectional area MQF need not constantly lie within the vehicle body 100, but can, as, for example, in a catamaran water vehicle, also form a non-closed area. In a horizontal cross section of a catamaran, for example, the maximum cross-sectional area MQF is composed of two separate cross-sectional areas which lie within the two hulls of the catamaran.

In another preferred embodiment, a minimum area MF defined by the data-transferring ring wiring 230 is larger than 20%, larger than 30%, larger than 40%, larger than 50%, larger than 60%, larger than 70%, larger than 80% or larger than 90% of a maximum cross-sectional area MQFH of the vehicle body 100 parallel to the horizontal H. The horizontal H is illustrated in FIG. 3A and is defined as a plane which is vertical on a perpendicular in the direction of gravity. In a water vehicle 10c, the horizontal H is, for example, parallel to the water surface. In a land vehicle 10b, the horizontal H is to be defined as a plane formed by the three or four wheels. In an air vehicle 10a, the horizontal plane H is to be defined as parallel to the plane of the airfoils of the air vehicle 10a. The use of a maximum cross-sectional area MQFH of the vehicle body 100 parallel to the horizontal H as a comparative figure for the minimum area MF defined by the data-transferring ring wiring 230 is particularly practical if the minimum area MF defined by the data-transferring ring wiring 230 itself forms an area substantially parallel to the horizontal H.

Figure 3B:
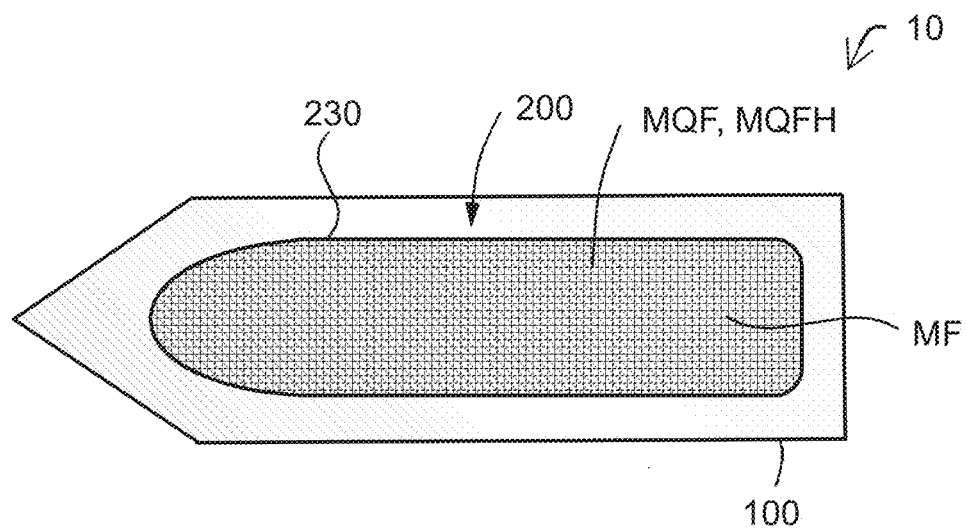

In the maximum cross-sectional area MQF of the vehicle body 100 shown by the cross section AA' in FIG. 3B, the maximum cross-sectional area MQFH is parallel to the horizontal H at the same time. In this process, in the case of an attack from the air, it is practical if the minimum area MF defined by the data-transferring ring wiring 230 is substantially parallel to the horizontal and larger than 20%, 30%, 40%, 50%, 60%, 70%, 80% or 90% of a maximum cross-sectional area MQFH of the vehicle body 100 parallel to the horizontal H.

When using a mixed topology, i.e. a combination of various network types such as a bus network, a star network and a ring network, the network subscribers can initially also be connected to the network node 220 in the form of a star, which are provided in the data-transferring ring wiring 230. However, in this mixed topology it is practical if the data-transferring ring wiring 230 cannot be destroyed by a single hit. Thus, the minimum area MF defined by the data-transferring ring wiring 230 is larger than 5 m$^2$, larger than 7 m$^2$, larger than 10 m$^2$, larger than 15 m$^2$, larger than 20 m$^2$, larger than 25 m$^2$, larger than 30 m$^2$, larger than 50 m$^2$, larger than 100 m$^2$, larger than 200 m$^2$ or larger than 500 m$^2$.

By providing a minimum area MF with a specific minimum size, the fail safety is decisively reduced when a portion of the vehicle 10 is hit. For this purpose, the ring wiring 230 can be routed along a marginal area of the vehicle 10 to maximize the enclosed minimum area MF.

Figure 4A:
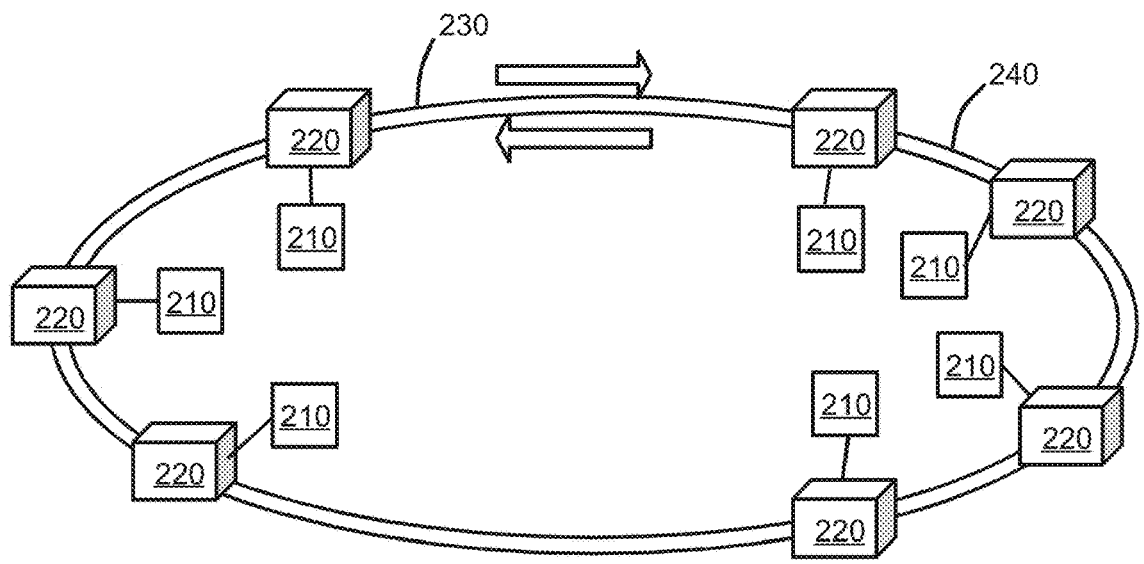
FIGS. 4A and 4B show schematic block diagrams of a wired data transfer network with and without a defect in the ring wiring according to an exemplary embodiment of the present invention.
Figure 4B:
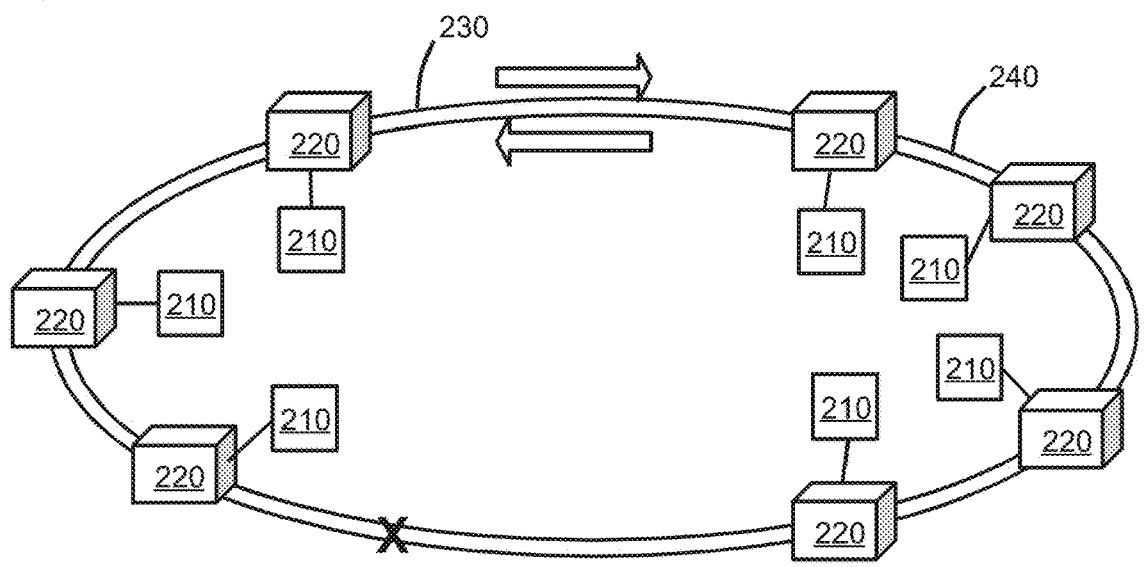
Figure 5:
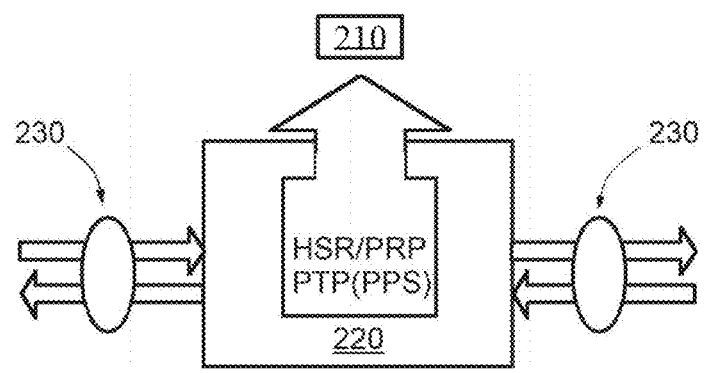
FIG. 5 shows a schematic detailed view of a network node in a data transfer network according to an exemplary embodiment of the present invention.

FIGS. 4A and 4B show a schematic block diagram of an exemplary embodiment of the data transfer network 200. FIG. 5 shows a detailed view of a network node 220 of the data transfer network 200 shown in FIGS. 4A and 4B.

The aforedescribed network subscribers 210 are connected to the data-transferring ring wiring 230 via network nodes 220. In a preferred embodiment, the data transfer network 200 is Ethernet-based, with the data being transmitted by means of an HSR/PRP protocol. "High Available Seamless Redundancy" (HSR) is a network protocol for Ethernet, which provides a seamless failure protection against an error of an arbitrary network component. HSR network nodes have two ports and act as a switch (bridge), which enables their use within a ring or a network structure, without using dedicated switches. An HSR network node 220 has at least two Ethernet ports, which are each connected to an adjacent HSR network node 220, so that two paths exist between two nodes at any time. Therefore, as long as a path is in operation, the target application receives a data frame at any time. The HSR network nodes 220 continuously check the redundancy to detect hidden errors. When using an HSR ring as the data transfer network 200, the additional network switches are omitted, which are necessary for a star topology, which must be installed, configured and maintained distributed over the ship.

The HSR ring is designed for a maximum of 512 nodes, which is sufficient for a navigation data distribution. Since both standard twisted pair lines (CAT6) and fiber optic cables can be used, there are no length problems for the networking of the vehicle 10, in particular, for the ship networking. By using standard gigabit Ethernet components, good testability and short transmission times are ensured. The ring wiring 230 must be installed only once. The network nodes 220 can be integrated into the data-transferring ring wiring 230 at appropriate locations and thus be placed close to the network subscribers 210 configured as sensors or actuators. Interface converters or computers can be integrated into the network node 220.

As shown in FIG. 4B, a line/cable interruption does not lead to data loss, since the data arrives at each network node 220 through the opposite transmission of data in both directions of the ring of the data-transferring ring wiring 230. The same is true for the failure of a network node 220.

Exact time synchronization on board the vehicle 10 is elementary to allocate asynchronous events in a chronologically correct manner. The "Network Time Protocol" (NTP) only allows synchronization in the range of milliseconds which, however, are not precisely enough for some specific applications. For this reason, additional synchronization lines had to be laid in known vehicles such as ships and submarines. By using synchronization of the time on board the vehicle 10 by means of the "Precise Time Protocol" (PTP) according to IEEE 1588 v2 in conjunction with HSR, i.e. by using an HSR/PTP protocol (FIG. 5), the synchronization lines can be omitted. At the same time, synchronization in the nanosecond range is possible. Therefore, the data transfer network 200 can be suited for synchronization of the network subscribers 210.

In the aforedescribed exemplary embodiments, the data transfer network 200 according to the invention has been described with a data-transferring ring wiring 230. However, it is also possible that the data transfer network 200 has at least two data-transferring ring wirings. This is illustrated in FIG. 6. In this process, the data-transferring ring wirings 230, 240 can form a network wiring with a common wiring section, or at least two of the data-transferring ring wirings 230, 240 can also be designed separately and, in each case, decoupleably connected to one another via a connecting means 260.

A separation of the data-transferring ring wirings 230, 240 is illustrated in FIG. 6. Using the HSR/PRP protocol, it is possible to couple different network segments to one another and decouple them. In this process, the connecting means 260 can couple the data-transferring separate ring wirings 230, 240 to one another in a redundant manner. When using an HSR ring, so-called "QuadBoxes" are used as connecting means 260, through which the corresponding HSR rings can be redundantly coupled to one another. In addition, two QuadBoxes can each be used for a coupling of two separate ring wirings 230, 240 as a connecting means 260, in order to achieve additional redundancy in the coupling of the data-transferring ring wirings 230, 240.

A separation of the individual separate data-transferring ring wirings 230, 240 configured as an HSR ring is reasonable, since all network nodes 220 designed as "Dual-Attached-Nodes" (DAN) on a ring should be supplied with power preferably at the same time. Different networks can also be decoupled with regard to their security requirements via additional routers/firewalls. It is thereby possible to integrate existing network components. These can be connected to the data-transferring ring wiring 240 or 230 via a so-called RedBox (redundancy box) 270.

Network components, which only have one network connection, are referred to as SAN (single attached node). The exemplary embodiment shown in FIG. 6 is a known Ethernet network with a router/firewall 280, two switches 290 and network connections 295, which are designed as Ethernet SAN. The PRP/HSR protocol is a layer 2 protocol. Thus, arbitrary existing layer 3 and layer 4 protocols such as TCP/IP can be transmitted via the data transfer network 200 according to the invention based on HSR/PRP rings. In addition, the use of a virtual local area network (VLAN) is possible within the navigation segment with HSR/PRP and enhances data security. The static configuration of the network subscribers 210 is advantageous on vehicles 10, in particular, military vehicles 10, and, in particular, on ships and submarines to minimize a potential hazard.

As shown in FIGS. 7A and 7B, the vehicle 10 can further have a power supplying ring wiring 300 for supplying the network subscribers 210 of the data-transferring ring wiring 230 with energy. The fail safety of the power supplying ring wiring 300 is also given by the provision of a ring topology, so that, in the case of a defect (FIG. 7B), the power from a power source 310 reaches all network subscribers 310 by transmitting the power in both directions of the ring 300. To further enhance fail safety, own power sources 320 such as a battery or an emergency generator can be separately provided for particularly relevant or all network subscribers 210.

Accordingly, a highly available navigation network for vehicles, in particular, for ships and submarines, is provided in accordance with the invention. The object of the invention is a secured receipt of data from all network subscribers 210 of the vehicle 10. In the case of ships and submarines, data must be collected, checked for plausibility and distributed. For example, a depth sensor must have information as to in which direction to determine the depth. A radar sensor further requires corresponding navigation data. Weapons systems must react in a fraction of seconds to maintain their fitness for military service.

According to the IEC standard IEC62439-3, ring topologies have been used in data transfer networks in control units, however, mixed topologies have been used there, where the HSR ring within a control cabinet is connected to network subscribers connected in the form of a star. An application of the aforedescribed HSR data transfer architecture to vehicles, in particular, military vehicles, leads to enhanced fail safety and reliability, as well as availability of the data transfer network according to the invention within the vehicle and is therefore of great advantage especially in a military use.

The invention claimed is:

1. A vehicle having fail-safe internal data transfer, comprising:
   a vehicle body;
   a wired data transfer network provided on the vehicle body; and
   network subscribers provided on the vehicle body, which are connected to one another via network nodes of the data transfer network, wherein the data transfer network has a data-transferring ring wiring,
   characterized in that
   a minimum area defined by the data-transferring ring wiring is larger than 20% of a maximum cross-sectional area of the vehicle body.

2. The vehicle according to claim 1, characterized in that the vehicle comprises an air vehicle, a land vehicle or a water vehicle.

3. The vehicle according to claim 1, characterized in that the vehicle comprises a military vehicle, which has at least one weapon and at least one position detection device as network subscribers.

4. The vehicle according to claim 1, characterized in that a minimum area defined by the data-transferring ring wiring is larger than 20% of a maximum cross-sectional area of the vehicle body parallel to the horizontal.

5. The vehicle according to claim 1, characterized in that the minimum area defined by the data-transferring ring wiring is larger than 5 m².

6. The vehicle according to claim 1, characterized in that the data transfer network has at least two opposite data-transferring ring wirings.

7. The vehicle according to claim 6, characterized in that the data-transferring ring wirings form a network wiring.

8. The vehicle according to claim 6, characterized in that at least two of the data-transferring ring wirings are designed separately and, in each case, decoupleably connected to one another via a connecting means.

9. The vehicle according to claim 8, characterized in that the connecting means couples the data-transferring separate ring wirings to one another in a redundant manner.

10. The vehicle according to claim 1, characterized in that the data-transferring ring wiring comprises a fiber optic cable or a twisted pair line.

11. The vehicle according to claim 1, characterized in that the data transfer network is suited for synchronization of the network subscribers.

12. The vehicle according to claim 1, characterized in that the data transfer network is suited for Ethernet-based data transfer by means of an HSR/PRP protocol.

13. The vehicle according to claim 1, further comprising a power supplying ring wiring for supplying the network subscribers of the data-transferring ring wiring with energy.

14. The vehicle according to claim 1, characterized in that the network subscribers have at least one appliance selected from a group which comprises a weapons control system, an integrated platform management system, an integrated monitoring and control system for helicopters, a demagnetizing system, a gyrocompass, a magnetic compass or a GPS/GLONASS receiver, an EM log, a Doppler log, an echo device, an automatic identification system AIS, an integrated control and monitoring system ICMS, a sonar, a periscope system, a weather station, a radar, a communication system, friend/foe identification IFF, an electronics assistance device, a repeater or empennage stabilization.

* * * * *